United States Patent [19]

Taylor

[11] Patent Number: 4,529,753
[45] Date of Patent: Jul. 16, 1985

[54] CHEMICAL/STEAM STRIPPING
[75] Inventor: Michael A. Taylor, Sarnia, Canada
[73] Assignee: Polysar Limited, Sarnia, Canada
[21] Appl. No.: 598,927
[22] Filed: Apr. 10, 1984
[51] Int. Cl.³ .............................................. C08L 27/06
[52] U.S. Cl. .................................... 523/328; 523/343;
524/800; 524/836
[58] Field of Search ................ 523/328, 343; 524/800,
524/836

[56] References Cited
U.S. PATENT DOCUMENTS

| 4,017,445 | 4/1977 | Grosse-Wortmann et al. | ..... 523/328 |
| 4,032,497 | 6/1977 | Kidoh et al. | .......................... 523/328 |
| 4,251,412 | 2/1981 | Ferrini | .................................. 528/492 |
| 4,272,425 | 6/1981 | Miller et al. | .......................... 525/315 |
| 4,278,582 | 7/1981 | Miller | .................................... 528/487 |

FOREIGN PATENT DOCUMENTS 1230664  5/1971  United Kingdom ................ 523/328

OTHER PUBLICATIONS

"Monomer Removal from Latex", by S. M. Englund, Dow Chemical Co., Aug. 1981, CEP, pp. 55–59.

Primary Examiner—Ronald W. Griffin
Attorney, Agent, or Firm—Stevens, Davis, Miller & Mosher

[57] ABSTRACT

Residual monomer may be removed from a polymeric emulsion by subjecting it to pressure and temperature conditions so that the ambient vapor pressure is less than the vapor pressure in the emulsion and concurrently and continuously during the treatment adding a free radical initiator.

19 Claims, 1 Drawing Figure

CHEMICAL/STEAM STRIPPING

FIELD OF THE INVENTION

The present invention pertains to the minimization of residual monomer in polymeric emulsions.

BACKGROUND OF THE INVENTION

Emulsion polymerization systems are well known for the production of many types of polymers including rubbery styrene-butadiene polymers and polymers containing acrylonitrile. In commercially used processes it is desirable to minimize the amount of residual monomer in the latex. This is desirable from an environmental point of view to minimize exposure to hydrocarbon monomers which may be odiferous or may present more serious health concerns. From an economic point of view the saving of 1 to 0.5 percent of free monomer is a significant cost saving to a plant. The current methods of reducing the residual monomer in a latex tend to be time consuming and slow down production. Furthermore, these processes tend to be energy intensive adding a further cost burden to the product.

OBJECT OF THE INVENTION

It is desirable to find a faster and less energy consuming method of reducing the residual monomer content in latices. Most preferably it is desirable to find a process that would tend to polymerize most of the residual monomer rather than trying to physically remove it.

The paper "Monomer Removal from Latex" by S. M. Englund, Chemical Engineering Progress, August 1981 pg. 55, presents a good discussion of some of the problems the industry faces. In a latex the removal of residual hydrocarbon monomer is limited by the rate at which the latex can be contacted with a fresh stream of a fluid, usually steam, to remove that monomer. Thus the latex may be contacted with relatively high amounts of steam to ensure adequate removal of monomer. This may lead to many different types of problems such as foaming, latex destabilization or latex degradation.

The B. F. Goodrich Company have developed a number of methods to remove residual acrylonitrile from aqueous polymeric emulsions. U.S. Pat. No. 4,251,412 issued Feb. 17, 1981, discloses as process for the reduction of residual acrylonitrile in a latex by adding a stoichiometric amount of amine to react with the ACN. U.S. Pat. No. 4,272,425 issued June 9, 1981, discloses a process for reducing the acrylonitrile content in a latex by adding additional catalyst and co-monomer in excess of the free ACN after 90 percent conversion of the monomers. U.S. Pat. No. 4,278,582 issued July 14, 1981, discloses a process for reducing the residual acrylonitrile content of a latex by adding thereto ammonia, ammonium hydroxide, thiols, $H_2S$ or alkali or alkaline earth metal carbonates, phosphates and silicates.

The present invention differs over the above art in that it does not contemplate the addition of further monomers to the latex.

The remaining methods of reducing residual monomers contemplate fluid injection, usually either steam or an inert gas, and/or passing the latex through an apparatus at reduced pressure.

SUMMARY OF THE INVENTION

The present invention provides a process of treating an emulsion of one or more monomers, at least 80 weight percent of which have been polymerized comprising subjecting said emulsion to temperature and pressure conditions at which the vapour pressure of water in the ambient environment is less than the vapour pressure of water in the emulsion without significantly degrading or destabilizing the emulsion and introducing into the emulsion at least about 0.01 parts by weight of a free radical generator per 100 parts by weight of polymer in the emulsion per hour of treatment until the residual monomer content is not more than 0.05 percent by weight based on the emulsion.

DETAILED DESCRIPTION OF THE INVENTION

Figure 1:
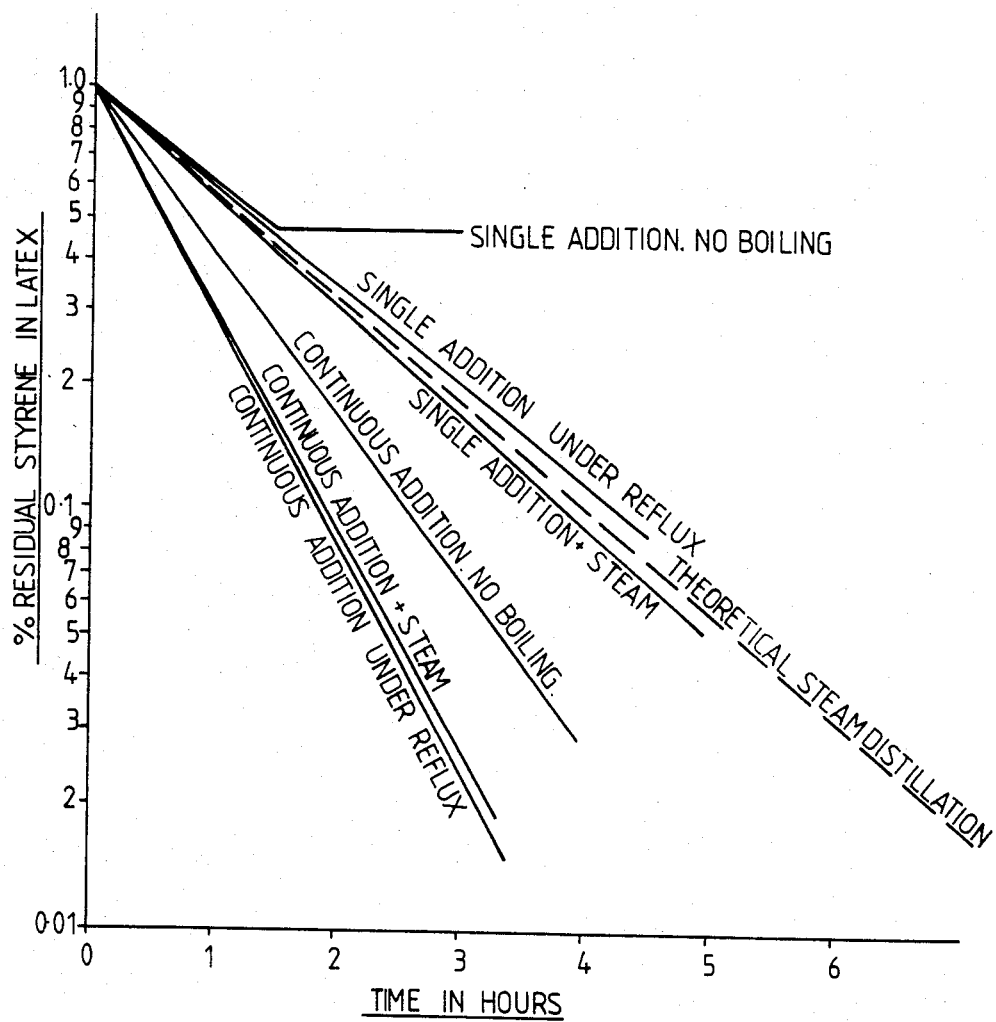

As used in this specification, the term free radical generator is intended to include a free radical generating agent per se and/or a combination of two or more chemicals which generates free radicals such as a peroxide and a reducing agent. If two more chemicals are used in the free radical generator the amount of agent specified refers to the total addition of all agents.

The present invention may be used with the following monomers:

$C_{8-12}$ vinyl aromatic monomers which may be unsubstituted or substituted by a $C_{1-4}$ alkyl or alkanol radical or a chlorine or bromine atom;

$C_{4-8}$ conjugated diolefins;

$C_{3-9}$ ethylenically unsaturated carboxylic acids;

$C_{3-9}$ ethylenically unsaturated aldehydes;

amide derivatives of $C_{3-9}$ ethylenically unsaturated acids which may be unsubstituted or further substituted at the nitrogen atom by a $C_{1-4}$ alkyl, alkanol, or alkylol radical;

$C_{1-8}$ alkyl or alkanol esters of $C_{3-9}$ ethylenically unsaturated carboxylic acids in which the alkyl or alkanol radical may be branched or straight chained;

$C_{2-8}$ alkenyl or alkenol esters of $C_{1-9}$ saturated carboxylic acids, in which the alkenyl or alkenol radical may be branched or straight chained;

$C_{2-8}$ ethylenically unsaturated nitriles; and vinyl or vinylidene chloride.

The process of the present invention is suitable with a wide range of homopolymers or copolymers. The process may be used to treat emulsion of polyvinyl chloride, vinyl esters of $C_{1-9}$ saturated carboxylic acids such as vinyl acetate, and olefin terpolymers thereof such as ethylene vinyl acetate, polystyrene, butadiene styrene polymers, butadiene styrene polymers which contain at least one further functional monomer, and polymers containing acrylonitrile.

The process is particularly useful in situations where one or more monomers are soluble in the resulting polymer. In these cases, the treatment is continued until the residual content of the monomer soluble in the polymer is not more than 0.05 weight percent based on the emulsion.

Preferably the process is used with emulsions of a polymer formed by polymerizing a monomeric mixture comprising:

30–100 weight percent of one or more monomers selected from $C_{8-12}$ vinyl aromatic monomer, $C_{2-8}$ ethylenically unsaturated nitrile or a mixture thereof;

0–60 weight percent of a $C_{4-8}$ conjugated diolefin;

0–10 weight percent of one or more monomers selected from the group comprising $C_{3-9}$ ethylenically unsaturated acid, $C_{3-9}$ ethylenically unsaturated aldehydes, amide derivatives of said $C_{3-9}$ ethylenically unsaturated acids, and $C_{1-8}$ alkyl or alkanol derivatives of $C_{3-9}$ ethylenically unsaturated acids.

The preferred vinyl aromatic monomers include styrene, α-methyl styrene, p-methyl styrene, chlorostyrene, bromostyrene, and divinyl benzene. The preferred nitrile is acrylonitrile. Preferably these monomers are initially present in an amount from 30 to 100 weight percent of the total monomer composition.

The preferred dienes are isoprene and butadiene. These monomers may be present in an amount up to about 60 weight percent of the total monomer mixture.

The initial monomer mixture may optionally contain up to 10 weight percent of a functional monomer. Functional monomers include ethylenically unsaturated acids, ethylenically unsaturated aldehydes, ethylenically unsaturated amides which may be unsubstituted or substituted by $C_{1-4}$ alkyl or alkanol radicals and $C_{1-8}$ alkyl or alkanol esters of a $C_{3-9}$ ethylenically unsaturated acids. Suitable functional monomers include acrylic acid, methacrylic acid, fumaric acid, itaconic acid, acrolein, methacrolein, cinnamaldehyde, acrylamide, methacrylamide, N-methylolacrylamide, N-methylol-methacrylamide, methylacrylate, methyl methacrylate, ethylacrylate, ethyl-methacrylate, hydroxyethyl acrylate, hydroxyethyl methacrylate, ethylhexyl acrylate, and ethylhexyl methacrylate.

The process of the present invention is particularly useful with monomer compositions of styrene, α-methyl styrene, p-methyl styrene, butadiene or isoprene together with one or more of the above functional monomers.

The process of the present invention is carried out under temperature and pressure conditions to avoid significantly degrading or destabilizing the latex. At 100° C. the vapour pressure of water is 760 mm of mercury. In the process of the present invention suitable temperatures and pressures range from 50° to 100° C. at pressures from 92 to 760 mm of mercury.

Preferred temperature/pressure conditions are from about 50° C. to about 92 mm of mercury to about 80° C. at about 355 mm of mercury. The most preferred temperature/pressure conditions are from about 50° C. at about 92 mm of mercury to about 70° C. at about 283 mm of Hg. It is important that the heat history during the process be such that no significant destabilization or degradation of the latex occur. One having the ordinary skill in the art may easily test a small sample of the latex to see if it is significantly degraded or destabilized on being exposed to a specific temperature and pressure conditions over a given period of time.

In accordance with the present invention at least about 0.01 parts by weight of a free radical generator are added to the latex per 100 parts by weight of the polymer in the latex. The free radical generator may consist of a chemical or a chemical combination which decomposes at the temperature of the treatment to generate free radicals such as hydrogen peroxide or an organic azo or diazo compound containing up to about 12 carbon atoms. Care should be taken to select a peroxide or azo or diazo material which will decompose under the conditions of use in a controlled manner.

Suitable free radical generators may comprise redox systems comprising an oxidizing agent such as hydrogen peroxide or an organic peroxide or hydroperoxide containing up to about 12 carbon atoms mixed with a reducing agent. Suitable reducing agents include reducing sugars and their acid derivatives, reducing sulphur compounds such as an alkali metabisulphite, or a transition metal compound.

Suitable peroxides and hydroperoxides include hydrogen peroxide, benzoyl peroxide and t-butyl hydroperoxide.

Suitable reducing agents include iron or cobalt complexes, or reducing sugars or their derivatives such as mannitol or gluconates. The reducing agent may be a sulphur containing compound such as an alkali or alkaline earth sulphate or bisulphite. A preferred reducing agent is sodium metabisulphite.

A particularly useful free radical generator system for use with styrene-butadiene type latices is t-butyl hydroperoxide and sodium metabisulphite. Preferably, the total free radical generator is present in an amount of about 0.08 parts by weight per 100 parts of polymer in the latex, consisting of about equal parts of peroxide and metabisulphite.

The free radical generating system is added to the latex in an amount of at least about 0.01 parts by weight per 100 parts by weight of polymer solids in the latex. The only limit on the upper amount of free radical generator is economics. A useful upper limit of free radical generator is about 0.20 parts by weight per 100 parts by weight of polymer in the latex. The free radical generator may be used in amounts from about 0.01 to about 0.15 parts by weight per 100 parts by weight of polymer in the latex. A suitable weight range for the free radical generator is from about 0.04 to about 0.08 parts by weight per 100 parts by weight of polymer solids.

The process of the present invention is not intended to relate to the initial polymerization of the monomer system. The process is generally applicable in a steam stripper subsequent to devolatilization of the latex.

The process of the present invention may also be applied to the latex, prior to devolatilization, in the reactor after about 80 percent of the monomer has been converted to polymer.

EXAMPLE

The following example is intended to illustrate the invention and not to limit it. Four 4 liter samples of a styrene-butadiene latex which was produced in the plant and which had been devolatilized were treated in accordance with different aspects of the present invention or the prior art. The sample was placed in a 12 liter flask immersed in a constant temperature bath. The flask was connected to a vacuum to control the vapour pressure above the sample. In this manner, it was possible to subject the sample to conditions ranging from no-boiling, boiling, reflux and steam injection.

A free radical generator comprising t-butylhydroperoxide and sodium metabisulphite was added to the system. In one experiment, the free radical generator was added in "one shot" in an amount of about 0.05 parts per 100 parts of monomer. The "one shot" addition was tested under reflux and under steam injection. The free radical generator was added incrementally in an amount of about 0.5 parts per hour under boiling, reflux and steam injection. Samples of the latex were tested periodically for residual styrene. A graph was then plotted of percentage residual styrene (on a logarithmic scale) against time in hours (linear scales). The plot of this data is given in FIG. 1. On the graph, the theoretical steam usage has also been plotted.

These graphs show that the process of the present invention is about twice as efficient as conventional steam stripping in the absence of a free radical generator. This improvement reduces energy consumption and significantly reduces the time required for the stripping of a latex. An increase in yield is also obtained.

What is claimed is:

1. A process of treating an aqueous emulsion of one or more monomers, at least 80 weight percent of which have been polymerized comprising subjecting said emulsion to temperature and pressure conditions at which the vapour pressure of water in the ambient environment is less than the vapour pressure of water in the emulsion without significantly degrading or destabilizing the emulsion and introducing into the emulsion at least about 0.01 parts by weight of a free radical generator per 100 parts by weight of polymer in the emulsion per hour of treatment until the residual monomer content is not more than 0.05 percent by weight based on the emulsion.

2. A process according to claim 1 wherein said one or more monomers are selected from the group:

$C_{8-12}$ vinyl aromatic monomers which are unsubstituted or substituted by a $C_{1-4}$ alkyl or alkanol radical or a chlorine or bromine atom;

$C_{4-8}$ conjugated diolefins;

$C_{3-9}$ ethylenically unsaturated carboxylic acids;

$C_{3-9}$ ethylenically unsaturated aldehydes;

amide derivatives of $C_{3-9}$ ethylenically unsaturated acids which are unsubstituted or further substituted at the nitrogen atom by a $C_{1-4}$ alkyl, alkanol, or alkylol radical;

$C_{1-8}$ alkyl or alkanol esters of $C_{3-9}$ ethylenically unsaturated carboxylic acids in which the alkyl or alkanol radical is branched or straight chained;

$C_{2-8}$ alkenyl or alkenol esters of $C_{1-9}$ saturated carboxylic acids, in which the alkenyl or alkenol radical is branched or straight chained;

$C_{2-8}$ ethylenically unsaturated nitriles; and vinyl or vinylidene chloride.

3. A process according to claim 2 wherein said temperature is from 50° to about 100° C. and the pressure is from about 92 mm of Hg to 760 mm of Hg.

4. A process according to claim 3 wherein the temperature and pressure is in the range from about 50° C. at about 92 mm of Hg to about 80° C. at about 355 mm of Hg.

5. A process according to claim 4 wherein the temperature and pressure is in the range from about 50° C. at about 92 mm of Hg to about 70° C. at about 233 mm of Hg.

6. A process according to claim 5 wherein the free radical generator is added in an amount from about 0.01 to about 0.10 parts by weight per 100 parts by weight of polymer per hour of treatment.

7. A process according to claim 6 wherein the free radical generator is added in an amount from about 0.04 to about 0.08 parts by weight per 100 parts by weight of polymer per hour of treatment.

8. A process according to claim 7 wherein said free radical generator is hydrogen peroxide or an axo or diazo compound containing up to 12 carbon atoms.

9. A process according to claim 7 wherein said free radical generator is a redox system wherein the oxidizing agent is selected from organic peroxides and organic hydroperoxides containing up to about 12 carbon atoms, and the reducing agent is selected from the group consisting of reducing sugars, acid derivatives of reducing sugars, a reducing sulphur compound and a transition metal compound.

10. A process according to claim 9 wherein the redox system is selected from an organic peroxide or an organic hydroperoxide containing up to about 12 atoms and the reducing agent is a sulphur compound.

11. A process according to claim 10 wherein the sulphur compound is an alkali metabisulphite.

12. A process according to claim 11 wherein the oxidizing agent is a $C_{1-4}$ alkyl peroxide or hydroperoxide and the reducing agent is sodium metabisulphite.

13. A process according to claim 12 wherein said temperature and pressure conditions are maintained in a reflux condenser.

14. A process according to claim 12 wherein said emulsion has been subjected to devolatilization.

15. A process according to claim 14 wherein said temperature and pressure conditions are maintained in a steam stripping apparatus.

16. A process according to claim 15 wherein said one or more monomers is a mixture having a composition comprising:

30-100 weight percent of one or more monomers selected from said vinyl aromatic monomer and said $C_{2-8}$ ethylenically unsaturated nitrile;

0-60 weight percent of said $C_{4-8}$ conjugated diolefin;

0-10 weight percent of one or more monomers selected from the group consisting of said $C_{3-9}$ ethylenically unsaturated acid, said $C_{3-9}$ ethylenically unsaturated aldehydes, said $C_{3-9}$ amide derivatives of said $C_{3-9}$ ethylenically unsaturated acids, and said $C_{1-8}$ alkanol derivatives of said $C_{3-9}$ ethylenically unsaturated acids.

17. A process according to claim 16 wherein said one or more monomers is a mixture having a composition comprising:

30-100 weight percent of one or more monomers selected from styrene, α-methyl styrene, p-methyl styrene, chlorostyrene, bromostyrene, divinylbenzene, and acrylonitrile;

0-60 weight percent of butadiene or isoprene;

0-10 weight percent of one or more monomers selected from acrylic acid, methacrylic acid, fumaric acid, itaconic acid, acrolein, methacrolein, cinnamaldehyde, acrylamide, methacrylamide, N-methylolacrylamide, N-methylol-methacrylamide, methylacrylate, methyl methacrylate, ethylacrylate, ethylmethacrylate, hydroxyethyl acrylate, hydroxyethyl methacrylate, ethylhexyl acrylate, and ethylhexyl methacrylate.

18. A process according to claim 17 wherein said one or more monomers is a mixture comprising:

30-100 weight percent styrene, α-methylstyrene or p-methylstyrene;

0-60 weight percent of butadiene or isoprene; and 0-10 weight percent of one or more monomers selected from acrylic acid, methacrylic acid, fumaric acid, itaconic acid, acrolein, methacrolein, cinnamaldehyde, acrylamide, methacrylamide, N-methylolacrylamide, N-methylol-methacrylamide, methylacrylate, methyl methacrylate, ethylacrylate, ethylmethacrylate, hydroxyethyl acrylate, hydroxyethyl methacrylate, ethylhexyl acrylate, and ethylhexyl methacrylate.

19. A process according to claim 15 wherein said monomers are selected from:

$C_{1-8}$ alkyl or alkanol esters of $C_{3-9}$ ethylenically unsaturated carboxylic acids in which the alkyl or alkanol radical is branched or straight chained;

$C_{2-8}$ alkenyl or alkenol esters of $C_{1-9}$ saturated carboxylic acids in which the alkenyl or alkenol radical is branched or straight chained.

* * * * *